(12) United States Patent
Koide et al.

(10) Patent No.: US 8,423,218 B2
(45) Date of Patent: Apr. 16, 2013

(54) TRAVEL CONTROLLER FOR INDUSTRIAL VEHICLE

(75) Inventors: Yukikazu Koide, Kariya (JP); Norihiko Kato, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 181 days.

(21) Appl. No.: 12/959,062

(22) Filed: Dec. 2, 2010

(65) Prior Publication Data

US 2011/0137503 A1 Jun. 9, 2011

(30) Foreign Application Priority Data

Dec. 4, 2009 (JP) ................................. 2009-276403

(51) Int. Cl.
*B60W 10/26* (2006.01)

(52) U.S. Cl.
USPC ....... 701/22; 701/50; 180/65.285; 180/65.29; 903/907

(58) Field of Classification Search .................... 701/22, 701/50; 180/65.1, 65.21, 65.285, 65.29; 903/902, 903, 906, 907, 908

See application file for complete search history.

(56) References Cited

U.S. PATENT DOCUMENTS

| | | | |
|---|---|---|---|
| 2008/0190703 A1* | 8/2008 | Kato et al. ..................... | 187/224 |
| 2009/0051322 A1* | 2/2009 | Kubota et al. ................. | 320/134 |
| 2010/0063682 A1* | 3/2010 | Akaki ............................. | 701/42 |

FOREIGN PATENT DOCUMENTS

| | | | |
|---|---|---|---|
| EP | 1 736 433 A1 | | 12/2006 |
| EP | 2 058 201 A1 | | 5/2009 |
| JP | 2003-054899 | * | 2/2003 |
| JP | 2003-054899 A | | 2/2003 |
| JP | 2004-357459 A | | 12/2004 |
| JP | 2005-200212 A | | 7/2005 |
| JP | 2005-298163 A | | 10/2005 |
| JP | 2006-050751 | * | 2/2006 |
| JP | 2006-050751 A | | 2/2006 |

OTHER PUBLICATIONS

European Search Report for corresponding EP Patent Application No. 10193515.3 dated Feb. 13, 2012.

* cited by examiner

*Primary Examiner* — Thomas Black
*Assistant Examiner* — Ce Li
(74) *Attorney, Agent, or Firm* — Sughrue Mion, PLLC (57) ABSTRACT

A travel controller for a hybrid forklift includes an acceleration command reference value generation unit, an acceleration limit value generation unit, an acceleration command value determination unit, and a travel motor control unit. The acceleration command reference value generation unit obtains an acceleration command reference value. The acceleration limit value generation unit obtains an acceleration limit value that limits an acceleration command value to a range that prevents discharge power of the battery from exceeding a battery discharge power limit value. The acceleration command value determination unit determines the acceleration command value for the travel motor from the acceleration command reference value and the acceleration limit value. The travel motor control unit controls the travel motor with the acceleration command value.

2 Claims, 6 Drawing Sheets

Accelerator Depression Amount (%)

Fig.4B

Rotation Speed Deviation (rpm)

TRAVEL CONTROLLER FOR INDUSTRIAL VEHICLE

BACKGROUND OF THE INVENTION

The present invention relates to a travel controller for an industrial vehicle including an engine, generator motor arranged coaxially with an engine, and a travel motor.

As one example of a prior art industrial vehicle, Japanese Laid-Open Patent Publication No. 2005-298163 describes a hybrid cargo handling industrial vehicle including an engine, a generator motor, a cargo handling pump, a travel motor, a generator motor, and a battery. The battery supplies the generator motor and travel motor with drive power. The engine, generator motor, and cargo handling pump are arranged coaxially with one another.

Japanese Laid-Open Patent Publication No. 2004-357459 describes a hybrid automobile. In this hybrid automobile, when a target torque of the travel motor is not within a tolerable torque range, the target torque is set so that the power output from the battery remains within a limited range.

In industrial vehicles such as a forklift, the vehicle speed is normally determined by the operation amount of an accelerator (e.g., depression amount of accelerator pedal). In this case, the desired vehicle speed may be obtained without having to adjust the accelerator operation amount in accordance with the load on the vehicle that increases and decreases depending on the handled cargo. In such an industrial vehicle, the acceleration, deceleration, and speed of the rotation produced by the travel motor are controlled to obtain the desired vehicle speed. When there is a difference in the power of the travel motor and the power of the generator motor, power corresponding to the difference is charged to or discharged from the battery. When the vehicle is accelerated, the power of the travel motor rapidly changes. Thus, the power of the generator motor cannot follow the power of the travel motor. Such response lag in the engine-power generator system results in the discharge of a large amount of power from the battery. The power discharged from the battery is controlled so as not to exceed a limit value, which varies in accordance with the state of the battery. However, the acceleration performance of the vehicle would be adversely affected when over-restricting acceleration so as not to exceed the limit value. Thus, it is desirable that the power discharged from the battery be prevented from exceeding the limit value without over-restricting acceleration. However, Japanese Laid-Open Patent Publication No. 2004-357459 does not address such concern.

SUMMARY OF THE INVENTION

It is an object of the present invention to provide a travel controller for an industrial vehicle that prevents the power discharged from a battery from exceeding a limit value without over-restricting acceleration.

To achieve the above object, one aspect of the present invention provides a travel controller for an industrial vehicle including an engine, a generator motor arranged coaxially with the engine, a travel motor for performing a travel operation, an operation unit for performing an operation to drive the travel motor, and a battery for supplying drive power to the generator motor and the travel motor. The travel controller includes an acceleration command reference value generation unit, an acceleration limit value generation unit, an acceleration command value determination unit, and a travel motor control unit. The acceleration command reference value generation unit obtains an acceleration command reference value from an operation state of the operation unit and a rotation speed of the travel motor. The acceleration limit value generation unit obtains an acceleration limit value from information including the rotation speed of the travel motor and output power of the generator motor. The acceleration limit value limits an acceleration command value to a range that prevents discharge power of the battery from exceeding a discharge power limit value. The acceleration command value determination unit determines the acceleration command value for the travel motor from the acceleration command reference value and the acceleration limit value. The travel motor control unit controls the travel motor with the acceleration command value.

In this manner, the travel controller for an industrial vehicle according to the present invention obtains the acceleration limit value, which limits the acceleration command value to a range that prevents the discharge power of the battery from exceeding the discharge power limit value, from information including the rotation speed of the travel motor and output power of the generator motor. Then, the travel controller determines the acceleration command value for the travel motor from the acceleration command reference value, which is based on the operation state of the operation unit and the rotation speed of the travel motor, and the acceleration limit value. This obtains the acceleration command value that is restricted beforehand to a range preventing the discharge power limit value of the battery from being exceeded. Accordingly, the discharge power of the battery is prevented from exceeding the discharge power limit value without over-restricting acceleration.

Preferably, the acceleration command value determination unit determines the smaller one of the acceleration command reference value and the acceleration limit value as being the acceleration command value.

In this case, the acceleration command value that is restricted to a range preventing discharge power of the battery from exceeding the discharge power limit value of the battery is obtained through a simple process in an ensured manner.

Preferably, the travel controller further includes a weight estimation unit that estimates the gross weight of the industrial vehicle. The acceleration limit value generation unit obtains the acceleration limit value from information including the rotation speed of the travel motor, the output power of the generator motor, and the gross weight of the industrial vehicle.

Many industrial vehicles such as a forklift are used to transport cargoes. In such an industrial vehicle, the gross vehicle weight changes in accordance with the weight of the carried cargo. A change in the gross vehicle weight would change the acceleration limit value. Accordingly, a highly accurate acceleration limit value that takes into consideration the weight of the handled cargo is obtained by estimating the gross weight of the industrial vehicle and obtaining the acceleration limit value using the information on the gross weight of the industrial vehicle.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A travel controller for an industrial vehicle according to a preferred embodiment of the present invention will now be discussed with reference to the drawings.

Figure 1:
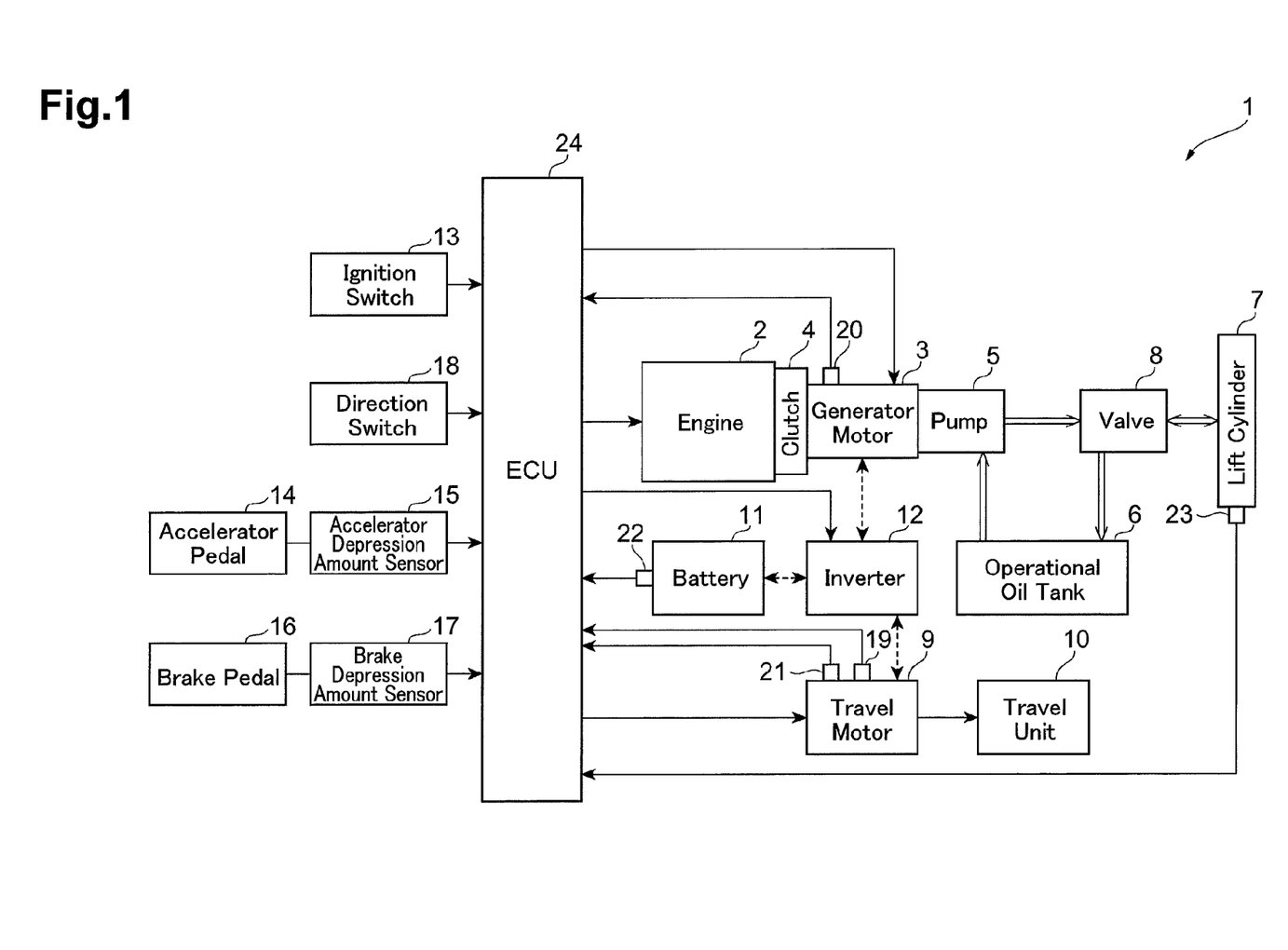
FIG. 1 is a schematic block diagram of a hybrid forklift including a travel controller according to a first embodiment of the present invention.

FIG. 1 shows a hybrid forklift 1, which serves as the industrial vehicle in the present embodiment.

The forklift 1 includes an engine 2 having a mechanical or electronic governor (not shown). A generator motor 3 is coupled by a drive shaft (not shown) to the engine 2. The engine 2 and generator motor 3 are arranged coaxially with each other. A clutch 4 is arranged between the engine 2 and the generator motor 3. The clutch 4 is not necessarily required.

The generator motor 3 operates in a generator mode and a motor mode. In the generator mode, the generator motor 3 is driven by the engine 2 and functions as a power generator that generates power. In the motor mode, the generator motor 3 functions as a motor. An electronic control unit (ECU) 24, which will be described later, generates mode switching signals to switch the operation mode of the generator motor 3.

The forklift 1 further includes a cargo handling pump 5, an oil tank 6, a lift cylinder 7, and a valve 8. The pump 5 is coupled by a drive shaft (not shown) to the engine 2 and the generator motor 3. The oil tank 6 is connected to the pump 5. The lift cylinder 7 lowers and lifts a fork (not shown). The valve 8 is arranged between the pump 5 and the lift cylinder 7. The pump 5 is arranged coaxially with the engine 2 and the generator motor 3. Further, the pump 5 is driven by the engine 2 and generator motor 3 to draw in operational oil from the oil tank 6 and then force out the operation oil. The lift cylinder 7 is driven by the operational oil forced out of the pump 5.

The forklift 1 includes a travel motor 9 and a travel unit 10, which is driven by the travel motor 9. The travel unit 10 is used to perform a travel operation that allows the forklift 1 to travel.

Further, the forklift 1 includes a battery 11 and an inverter 12 (power converter), which is connected to the battery 11. A nickel-metal hydride battery, a lithium-ion battery, a lead-acid battery, or the like may be used as the battery 11. When the generator motor 3 operates in the generator mode, the inverter 12 stores the power generated by the generator motor 3 in the battery 11. When the generator motor 3 operates in the motor mode and when the travel motor 9 is driven, the inverter 12 supplies power from the battery 11 to the generator motor 3 and the travel motor 9. The ECU 24 controls the charging and discharging of the battery 11 with a mode switching signal and a drive command signal.

The forklift 1 also includes an ignition switch 13, an accelerator pedal (accelerator) 14, an accelerator depression amount sensor 15, a brake pedal 16, a brake depression amount sensor 17, a direction switch 18, a travel motor rotation speed sensor 19, a generator motor power detector 20, a travel motor power detector 21, a battery state detector 22, a pressure sensor 23, and the ECU 24. The ignition switch 13 starts the engine 2. The accelerator depression amount sensor 15 detects the operation amount, or depression amount, of the accelerator pedal 14, which serves as an operation unit. The brake depression amount sensor 17 detects the operation amount, or depression amount, of the brake pedal 16. The direction switch 18 switches the traveling direction of the forklift 1 between forward and reverse. The travel motor rotation speed sensor 19 detects the speed of the rotation produced by the travel motor 9 (actual travel motor rotation speed). The generator motor power detector 20 detects the power output from the generator motor 3 (generator motor power). The travel motor power detector 21 detects the power output from the travel motor 9 (travel motor power). The battery state detector 22 detects the state of the battery 11, such as the temperature and state of charge of the battery 11. The pressure sensor 23 detects the pressure applied to the lift cylinder 7. The vehicle speed of the forklift 1 is determined in correspondence with the accelerator depression amount.

The ECU 24 controls all systems of the forklift 1. The ECU 24 receives an ON/OFF signal from the ignition switch 13, a forward/reverse signal from the direction switch 18, and detection signals from the accelerator depression amount sensor 15, the brake depression amount sensor 17, the travel motor rotation speed sensor 19, the generator motor power detector 20, the travel motor power detector 21, the battery state detector 22, and the pressure sensor 23. Further, the ECU 24 performs a predetermined process with the received signals and sends signals to the engine 2, the generator motor 3, the travel motor 9, and the inverter 12. More specifically, the ECU 24 sends drive command signals to the engine 2, the generator motor 3, and the travel motor 9. The ECU 24 also sends a mode switching signal to the inverter 12. Further, the ECU 24 provides the inverter 12 with the drive command signals sent to the generator motor 3 and the travel motor 9.

Figure 2:
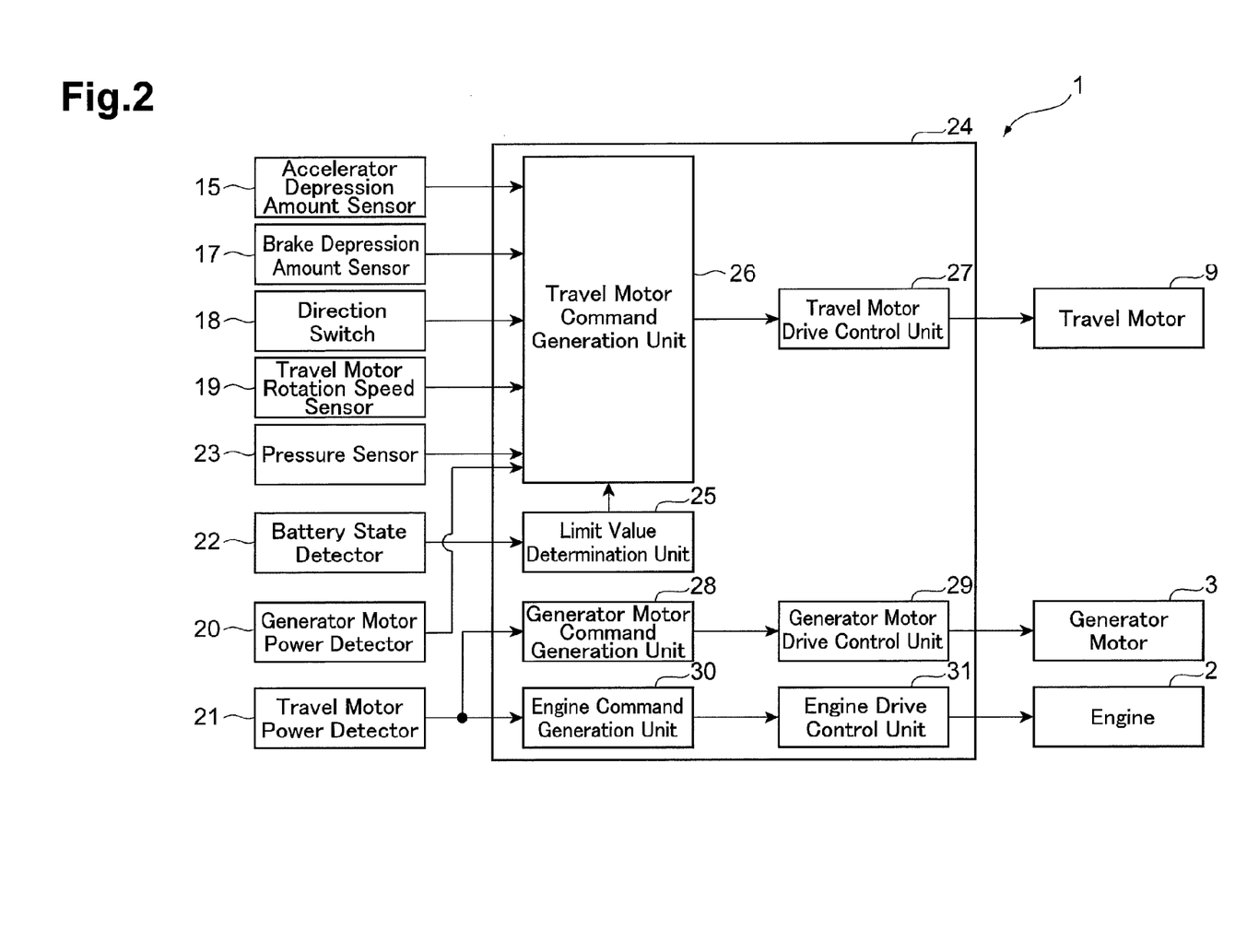
FIG. 2 is a functional block diagram showing the structure of an ECU shown in FIG. 1.

As shown in FIG. 2, the ECU 24 includes a battery discharge power limit value determination unit 25, a travel motor command generation unit 26, a travel motor drive control unit 27, a generator motor command generation unit 28, a generator motor drive control unit 29, and engine command generation unit 30, and an engine drive control unit 31.

The limit value determination unit 25 determines a discharge power limit value of the battery 11 (battery discharge power limit value) based on the temperature and state of charge of the battery 11 detected by the battery state detector 22.

The travel motor command generation unit 26 uses the forward/reverse signal of the direction switch 18, the detection signals of the accelerator depression amount sensor 15, the brake depression amount sensor 17, the travel motor rotation speed sensor 19, the generator motor power detector 20, and the pressure sensor 23, and the battery discharge power limit value to obtain a rotation speed command value, an acceleration command value, a deceleration command value, and a power limit value as travel motor commands. Here, the travel motor command generation unit 26 generates a travel motor command so that the forklift 1 maintains the speed corresponding to the depression amount of the accelerator pedal 14.

The power limit value limits the power that drives the travel motor 9 so as to prevent the power from exceeding the battery discharge power limit value. The power limit value is calculated from the equation shown below.

Power Limit Value=Battery Discharge Power Limit Value−Generator Motor Power≧0

A process for obtaining the rotation speed command value and the accelerator command value with the travel motor command generation unit 26 will be described later in detail.

The travel motor drive control unit 27 generates a drive command signal from the rotation speed command value, the acceleration command value, the deceleration command value, and the power limit value. The travel motor drive control unit 27 then controls the travel motor 9 in accordance with the drive command signal.

The generator motor command generation unit 28 obtains a generator motor command power from the detection signal of the travel motor power detector 21. The generator motor command power is calculated from the equation shown below. Here, the generated power of the generator motor 3 is indicated as being negative (minus). Thus, the generator motor command power required for the forklift 1 to travel is zero or less.

Generator Motor Command Power=(−1)×Travel Motor Power≦0

The generator motor drive control unit 29 generates the drive command signal from the generator motor command power. Then, the generator motor drive control unit 29 controls the generator motor 3 in accordance with the drive command signal.

The engine command generation unit 30 uses the detection value of the travel motor power detector 21 to obtain a rotation speed command value required for the engine 2. The rotation speed command value increases the rotation speed of the engine to a rotation speed that is sufficient for generating power with the generator motor 3.

The engine drive control unit 31 uses the rotation speed command value to generate a drive command signal. Then, the engine drive control unit 31 controls a throttle actuator (not shown) of the engine 2 in accordance with the drive command signal.

Figure 3:
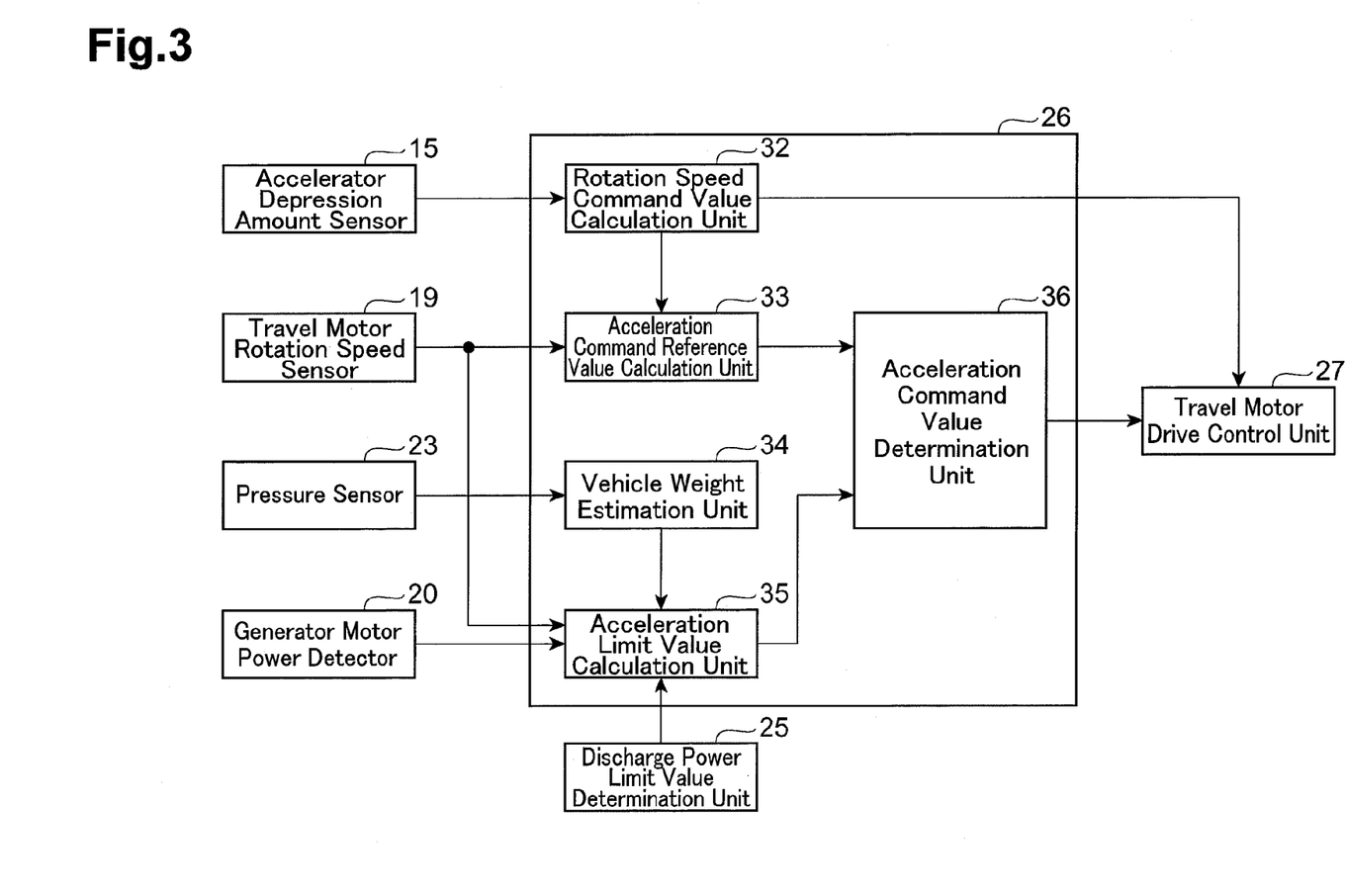
FIG. 3 is a block diagram showing part of a travel motor command generation unit shown in FIG. 2.

As shown in FIG. 3, the travel motor command generation unit 26 includes a rotation speed command value calculation unit 32, an acceleration command reference value calculation unit 33, a vehicle weight estimation unit 34, an acceleration limit value calculation unit 35, and an acceleration command value determination unit 36.

Figure 4A:
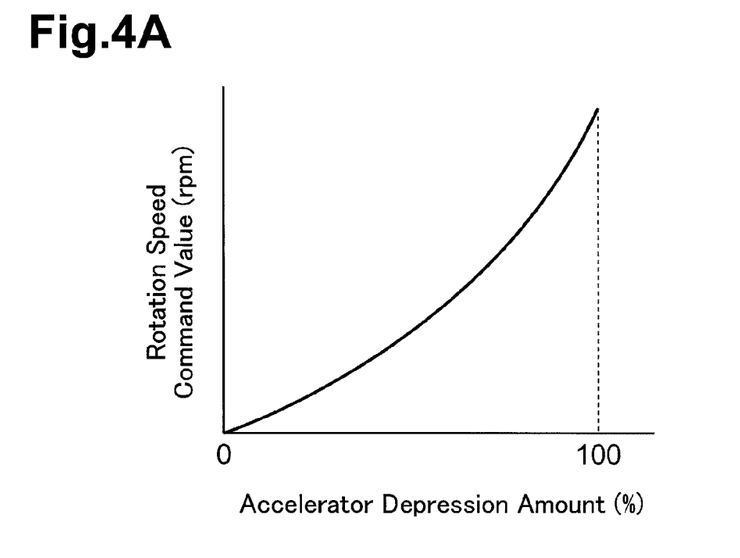
FIGS. 4A and 4B are graphs showing examples of maps used in a rotation speed command value calculation unit and acceleration command reference value calculation unit shown in FIG. 3.

The rotation speed command value calculation unit 32 uses the accelerator depression amount to obtain a rotation speed command value for the travel motor 9 (travel motor rotation speed command value). More specifically, the rotation speed command value calculation unit 32 uses a rotation speed command value map, which shows the relation of the accelerator depression amount and the rotation speed command value, to obtain the travel motor rotation speed command value corresponding to the accelerator depression amount. The rotation speed command value map shown in FIG. 4A is set so that the travel motor rotation speed command value increases like a quadratic curve as the accelerator depression amount increases. The rotation speed command value map is stored in a memory (not shown). The travel motor rotation speed command value calculated by the rotation speed command value calculation unit 32 is sent to the travel motor drive control unit 27.

The acceleration command reference value calculation unit 33 uses the travel motor actual rotation speed and the travel motor rotation speed command value to obtain an acceleration command reference value for the travel motor 9.

Figure 4B:
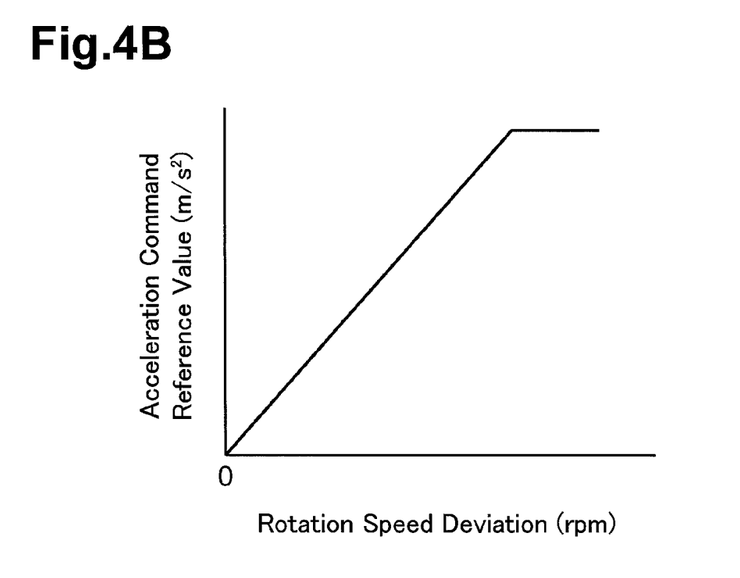

More specifically, after calculating the deviation (rotation speed deviation) of the travel motor rotation speed command value and the travel motor actual rotation speed, the acceleration command reference value calculation unit 33 uses an acceleration command reference value map such as that of FIG. 4B showing the relation of the rotation speed deviation and the acceleration command reference value to obtain the acceleration command reference value that corresponds to the rotation speed deviation. The acceleration command reference value map shown in FIG. 4B is set so that the acceleration command reference value increases in proportion to the rotation speed deviation but becomes constant when the rotation speed deviation exceeds a predetermined value. The acceleration command reference value map is stored in a memory (not shown).

The vehicle weight estimation unit 34 uses the pressure applied to the lift cylinder 7 to estimate the weight of a cargo carried by the fork (not shown). Then, the vehicle weight estimation unit 34 adds the estimated cargo weight to the weight of the forklift 1, which is known beforehand, to obtain the gross vehicle weight. To estimate the weight of the carried cargo, instead of using the pressure sensor 23, a weight sensor or the like may be used to directly detect the weight of the cargo carried by the fork.

The acceleration limit value calculation unit 35 uses various information including the travel motor actual rotation speed, the generator motor power, the gross vehicle weight, and the battery discharge power limit value to obtain an acceleration limit value so that the acceleration command value for the travel motor 9 is restricted to a range that prevents discharge power of the battery 11 from exceeding the battery discharge power limit value. The acceleration rate limit value is obtained as described below.

First, the power usable for traveling is calculated from the equation shown below.

Power Usable for Traveling=Battery Discharge Power Limit Value−Generator Motor Power−Margin  (1)

Further, the equation shown below is obtained from the vehicle's equation of motion.

Drive Force−Travel Resistance=(Gross Vehicle Weight+Rotational Inertia Weight)×Acceleration  (2)

Travel Resistance=Travel Resistance Coefficient× Gross Vehicle Weight×Gravitational Acceleration  (3)

Rotational Inertia Weight=Rotational Inertia Weight Coefficient×Gross Vehicle Weight  (4)

Torque at Tire Axis=Drive Force×Tire Radius  (5)

Torque at Motor Axis=Torque at Tire Axis/(Gear Ratio×Gear Efficiency)  (6)

Travel Motor Power=Travel Motor Rotation Speed× Torque at Motor Axis/(60/2π×1000)+Loss  (7)

Equations (2) to (7) may be organized to calculate the acceleration from the equation shown below.

$$\text{Acceleration} = \left[\dfrac{\dfrac{\text{Gear Ratio} \times}{\text{Gear Efficiency}}}{\text{Tire Radius}} \times \right. \quad (8)$$

$$\left. \dfrac{\text{Travel Motor Power} - \text{Loss}}{\text{Travel Motor Rotation Speed} \times \dfrac{60/2\pi \times 1000}{\text{Gross Vehicle Weight} \times (1 + \text{Rotational Inertia Weight Coefficient})}}\right] -$$

$$\left(\dfrac{\text{Travel Reistance Coefficient} \times \text{Gravitational Acceleration}}{1 + \text{Rotational Inertia Coefficient}}\right)$$

In equations (1) and (8), when the travel motor power is equal to the power usable for traveling, the acceleration limit value is calculated from the equation shown below.

$$\dfrac{\text{Acceleration}}{\text{Limit Value}} = \left[\dfrac{\dfrac{\text{Gear Ratio} \times}{\text{Gear Efficiency}}}{\text{Tire Radius}} \times \right.$$

$$\left. \dfrac{\text{Battery Discharge Power Limit Value} - \text{Generator Motor Power} - \text{Margin} - \text{Loss}}{\dfrac{\text{Travel Motor}}{\text{Rotation Speed}} \times \dfrac{60/2\pi \times 1000}{\text{Gross Vehicle Weight} \times (1 + \text{Rotational Inertia Weight Coefficient})}}\right] -$$

$$\left(\dfrac{\text{Travel Resistance Coefficient} \times \text{Gravitational Acceleration}}{1 + \text{Rotational Inertia Coefficient}}\right)$$

The margin and loss of power are predetermined values but may be variable. The gear ratio, gear efficiency, tire diameter, rotational inertia coefficient, and travel resistance coefficient are determined by the vehicle specification. These values are stored in a memory (not shown).

The acceleration command value determination unit 36 uses the acceleration command reference value and the acceleration limit value to determine a final acceleration command value for the travel motor 9. Then, the acceleration command value determination unit 36 sends the final acceleration command value to the travel motor drive control unit 27. More specifically, the acceleration command value determination unit 36 selects the smaller one of the acceleration command reference value and the acceleration limit value as the acceleration command value.

Figure 5:
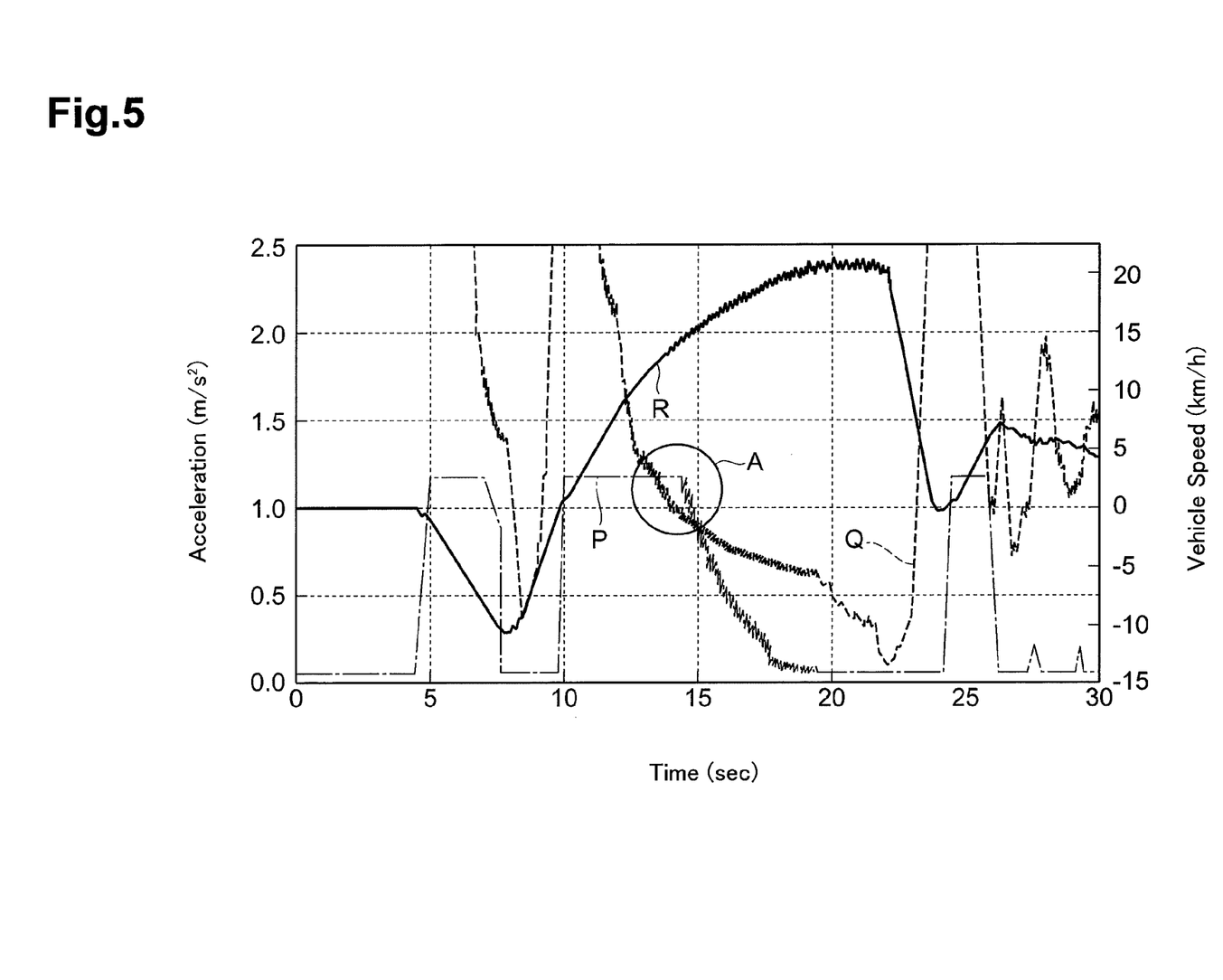
FIG. 5 is a graph showing one example of an acceleration command reference value and an acceleration limit value respectively obtained by the acceleration command reference value calculation unit and the acceleration limit value calculation unit shown in FIG. 3.

In FIG. 5, the single dashed line P represents the acceleration command reference value, the broken line Q represents the acceleration limit value, and the solid line R represents the solid line R. In the encircled section A of the graph at approximately 13.5 to 15 seconds, the acceleration limit value is smaller than the acceleration command reference value. Thus, the acceleration limit value is selected as the acceleration command value for the travel motor 9 in this range. In other ranges, the acceleration command reference value is smaller than the acceleration limit value. Thus, the acceleration command reference value is selected as the acceleration command value for the travel motor 9.

The accelerator depression amount sensor 15, the travel motor rotation speed sensor 19, the rotation speed command value calculation unit 32, and the acceleration command reference value calculation unit 33 function as an acceleration command reference value generation unit, which obtains the acceleration command reference value from the operation state of the operation unit and the rotation speed of the travel motor 9. The travel motor rotation speed sensor 19, the generator motor power detector 20, the battery state detector 22, the battery discharge power limit value determination unit 25, and the acceleration limit value calculation unit 35 function as an acceleration limit value generation unit, which obtains the acceleration limit value from information including the rotation speed of the travel motor 9 and the output power of the generator motor. The acceleration limit value restricts the acceleration command value to the range that prevents the discharge power of the battery 11 from exceeding the discharge power limit value of the battery 11. The acceleration command value determination unit 36 determines the acceleration command value for the travel motor 9 from the acceleration command reference value and the acceleration limit value. The travel motor drive control unit 27 functions as a travel motor control unit that controls the travel motor 9 with the acceleration command value. Further, the pressure sensor 23 and the vehicle weight estimation unit 34 function as a vehicle weight estimation unit that estimates the gross weight of the industrial vehicle (forklift 1).

Figure 6:
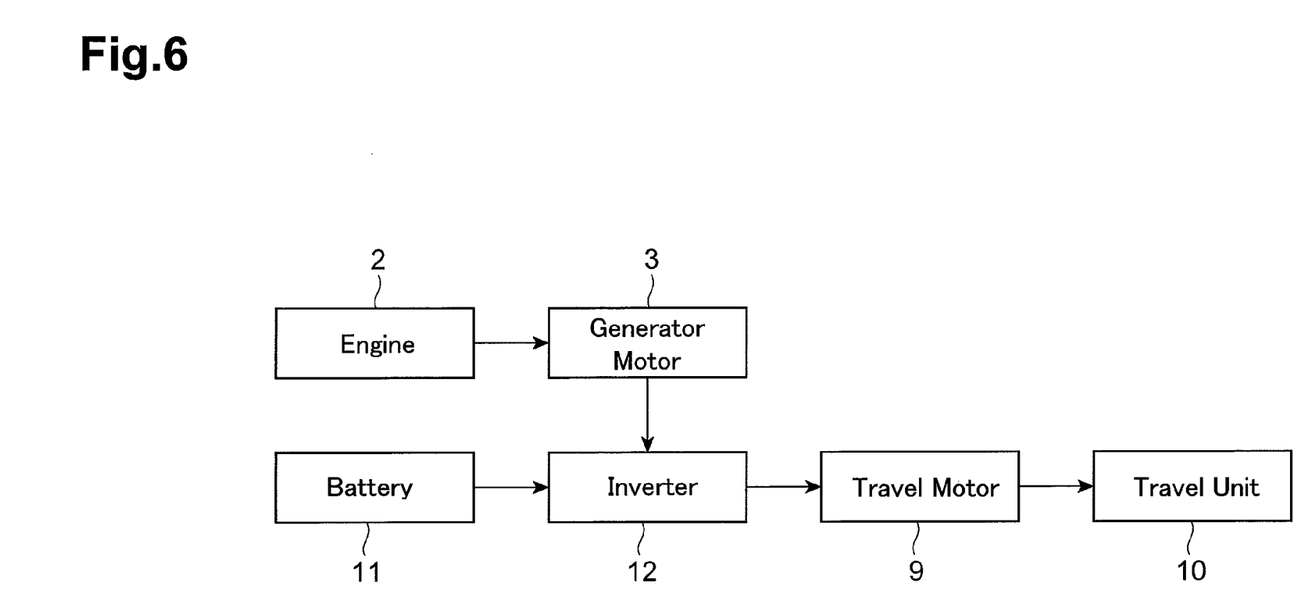
FIG. 6 is a block diagram showing the flow of power when the forklift shown in FIG. 1 undergoes full acceleration.

When a change in the vehicle speed is small, the change in the travel motor power is small. Thus, the generator motor power would easily follow the travel motor power. However, when a high level of acceleration is required such as during full acceleration, the travel motor power suddenly changes and a large amount of power is generated in an intermediate speed range. As a result, the generator motor power would not be able to follow the travel motor power. This would cause a control lag and response lag in the engine-power generator system. Further, in the flow of power shown in FIG. 6, a large amount of power would be drained from the battery 11. Even in such a case, the battery discharge power limit value, which varies in accordance with the battery state such as the temperature and state of charge, must not be exceeded.

In the present embodiment, the travel motor command generation unit 26 obtains the acceleration command reference value from the accelerator depression amount and the travel motor rotation speed, uses the vehicle's equation of motion to obtain the acceleration limit value limiting the acceleration command value to the range that prevents the discharge power of the battery 11 from exceeding the discharge power limit value, and selects the smaller one of the acceleration command reference value and the acceleration limit value as the acceleration command value for the travel motor 9. Thus, the acceleration command value for the travel motor 9 is generated beforehand in a range that prevents the battery discharge power limit value from being exceeded. This prevents the discharge power of the battery 11 from exceeding the battery discharge power limit value without over-restricting acceleration. In this manner, as long as the acceleration is within a certain range, the battery 11 is protected without the driver becoming aware of a decrease in the acceleration performance.

In the equation for calculating the acceleration limit value, one parameter is the gross vehicle weight including the carried cargo. In the present embodiment, the pressure sensor 23 or the like is used to estimate the weight of the carried cargo when calculating the gross vehicle weight. Thus, the travel controller of the present embodiment is applicable to changes in the gross vehicle weight when carrying cargoes and thereby obtains an accurate acceleration limit value.

The process for calculating the acceleration limit value and the process for determining the acceleration command value may be performed by making simple software modifications and do not need new components to be added. Thus, costs are not increased.

It should be apparent to those skilled in the art that the present invention may be embodied in many other specific forms without departing from the spirit or scope of the invention. Particularly, it should be understood that the present invention may be embodied in the following forms.

The acceleration command reference value does not have to be selected from the smaller one of the acceleration command reference value and the acceleration limit value like in the above-discussed embodiment. For example, the ratio of the acceleration command reference value and the acceleration limit value may be determined to calculate the acceleration command value.

In the above-discussed embodiment, the present invention is applied to a travel controller for a forklift including cargo handling equipment. However, the present invention is also applicable to an industrial vehicle that does not include cargo handling equipment.

The present examples and embodiments are to be considered as illustrative and not restrictive, and the invention is not to be limited to the details given herein, but may be modified within the scope and equivalence of the appended claims.

What is claimed is:

1. A travel controller for an industrial vehicle including an engine, a generator motor arranged coaxially with the engine, a travel motor for performing a travel operation, an operation unit for performing an operation to drive the travel motor, and a battery for supplying drive power to the generator motor and the travel motor, the travel controller comprising:
   an acceleration command reference value generation unit that obtains an acceleration command reference value from an operation state of the operation unit and a rotation speed of the travel motor;
   an acceleration limit value generation unit that obtains an acceleration limit value from information including the rotation speed of the travel motor and output power of the generator motor by using an equation of motion of the vehicle, in which the acceleration limit value limits an acceleration command value to a range that prevents discharge power of the battery from exceeding a discharge power limit value;
   an acceleration command value determination unit that determines the acceleration command value for the travel motor from the acceleration command reference value and the acceleration limit value; and
   a travel motor control unit that controls the travel motor with the acceleration command value,
   wherein the acceleration command value determination unit determines the smaller one of the acceleration command reference value and the acceleration limit value as being the acceleration command value.

2. A travel controller for an industrial vehicle including an engine, a generator motor arranged coaxially with the engine, a travel motor for performing a travel operation, an operation unit for performing an operation to drive the travel motor, and a battery for supplying drive power to the generator motor and the travel motor, the travel controller comprising:
   an acceleration command reference value generation unit that obtains an acceleration command reference value from an operation state of the operation unit and a rotation speed of the travel motor;
   a weight estimation unit that estimates the gross weight of the industrial vehicle;
   an acceleration limit value generation unit that obtains an acceleration limit value from information including the rotation speed of the travel motor, output power of the generator motor and the gross weight of the industrial vehicle, in which the acceleration limit value limits an acceleration command value to a range that prevents discharge power of the battery from exceeding a discharge power limit value;
   an acceleration command value determination unit that determines the acceleration command value for the travel motor from the acceleration command reference value and the acceleration limit value; and
   a travel motor control unit that controls the travel motor with the acceleration command value,
   wherein the acceleration command value determination unit determines the smaller one of the acceleration command reference value and the acceleration limit value as being the acceleration command value.

* * * * *